United States Patent
Buehler et al.

[11] Patent Number: 5,732,509
[45] Date of Patent: Mar. 31, 1998

[54] GUIDE AND SEALING SYSTEM VEHICLE WINDOW FLUSH WITH BODY SURFACE

[75] Inventors: William E. Buehler, Toledo, Ohio; Darrell K. Kleinke, Livonia, Mich.; Christian M. Norton, Novi, Mich.; Douglas Martinelli, Livonia, Mich.

[73] Assignee: Ford Global Technologies, Inc., Dearborn, Mich.

[21] Appl. No.: 664,059

[22] Filed: Jun. 13, 1996

[51] Int. Cl.[6] ................................................. E05D 15/16
[52] U.S. Cl. .......................... 49/440; 49/475.1; 49/490.1; 49/495.1
[58] Field of Search ........................ 49/440, 441, 475.1, 49/495.1, 490.1, 498.1, 374

[56] References Cited

U.S. PATENT DOCUMENTS

| | | |
|---|---|---|
| 4,454,688 | 6/1984 | Rest et al. . |
| 4,604,830 | 8/1986 | Maeda et al. . |
| 4,608,779 | 9/1986 | Maeda et al. . |
| 4,656,784 | 4/1987 | Brachmann . |
| 4,875,307 | 10/1989 | Barbero . |
| 4,932,161 | 6/1990 | Keys et al. ........................ 49/441 X |
| 5,040,333 | 8/1991 | Mesnel et al. . |
| 5,054,242 | 10/1991 | Keys et al. ........................ 49/374 X |
| 5,345,719 | 9/1994 | Karwande . |

*Primary Examiner*—Jerry Redman
*Attorney, Agent, or Firm*—David B. Kelley

[57] ABSTRACT

A lowerable window in an automotive vehicle has a guide and sealing system with a guide member attached substantially along the length of an edge of the window pane so as not to overlap with the outer surface thereof, the guide member having a guide conduit for interaction with a door channel having two prongs extending from vehicle door panels which define a channel portion therebetween. A guide member and the door channel are interposed such that the guide member receives a first prong of the door channel within the guide conduit and the door channel receives a guide edge within the channel portion. A seal member is mounted on the door channel so as to substantially fill a space between the guide edge and the first prong, and has at least three lip members, two of which extend laterally outward from the two prongs of the door channel so as to contact inward facing surfaces of the guide member. A compliant bulbous lip member is compressively sealingly interposed in non-overlapping relationship between the window edge and the outer surface of the vehicle door.

13 Claims, 3 Drawing Sheets

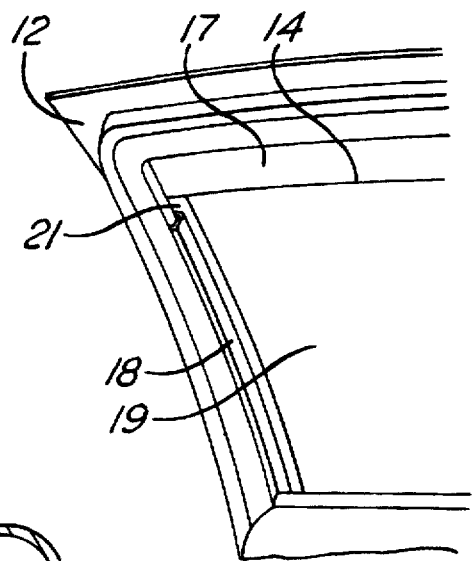
FIG.4
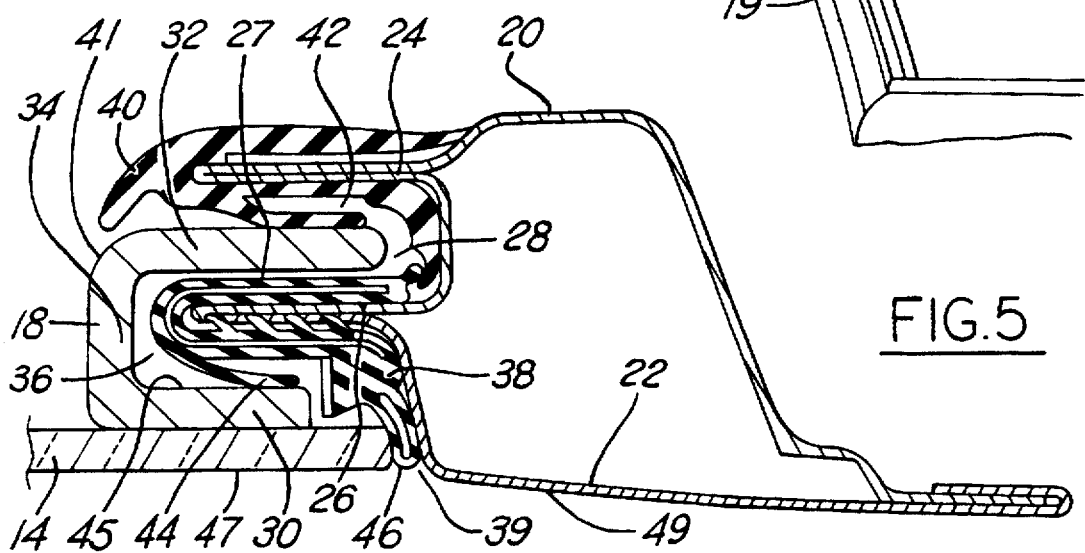
FIG.5
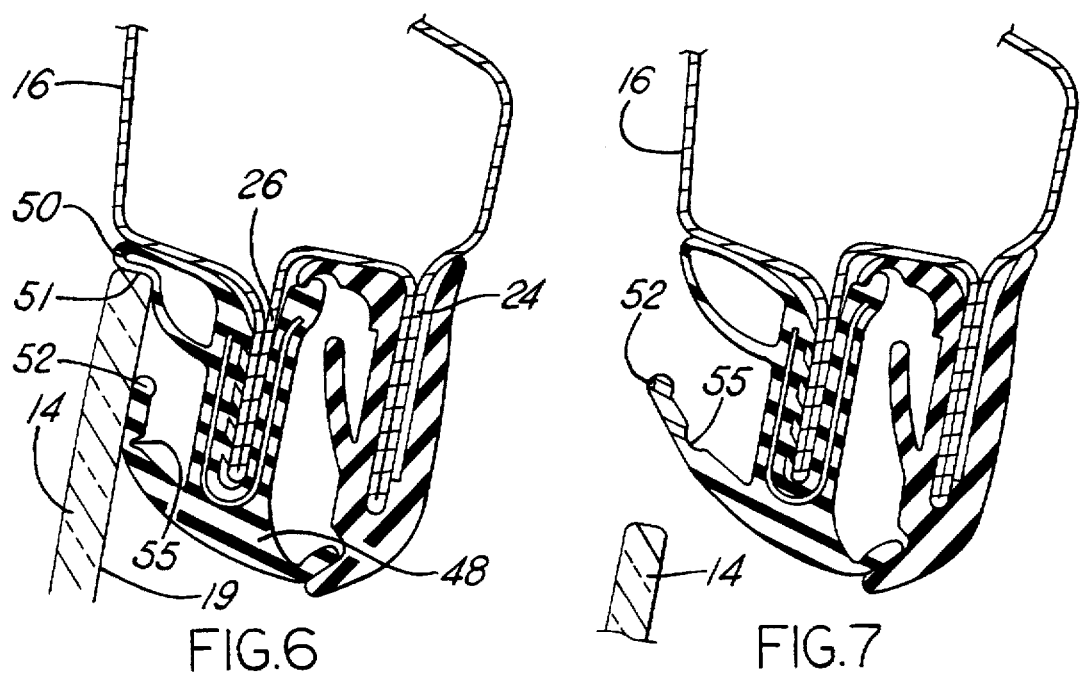
FIG.6
FIG.7

GUIDE AND SEALING SYSTEM VEHICLE WINDOW FLUSH WITH BODY SURFACE

FIELD OF THE INVENTION

The present invention relates generally to automotive vehicle windows, and, more particularly, to a vehicle window guide and sealing system to provide a window flush with the vehicle body surface.

BACKGROUND OF THE INVENTION

It has been recognized in automotive vehicle design that both the aerodynamic and aesthetic characteristics of a body surface may be improved by providing a window in substantially flush relationship with the adjacent body surface. Particularly with respect to lowerable windows, a guide and sealing system must provide stable and continuous guiding and sealing without disrupting the window-to-body surface continuity. While many window guidance seal system claim to provide a flush window system, in practice the outer surface continuity is disrupted by a seal member or a guide member. For example, U.S. Pat. Nos. 4,604,830 (Maeda et al), 4,875,307 (Barbero), and 4,608,779 (Maeda et al), depict seal members which overlap the outer surface of the window, and depend in part on this overlap for window retention.

An important challenge for window designers is to provide stable retention as well as secure sealing between the window and vehicle door while also achieving a flush window-to-body appearance. Use of relatively short guide members for retention and guiding the window within the door frame is known from the aforementioned patents, among others. While the retention afforded by such guide members may be sufficient for the window designs shown, particularly with the retention assistance of an overlapped seal member, such may not be sufficient for a truly flush window system, such as in the present invention. Other designs, including that shown in U.S. Pat. No. 5,040,333 (Mesnel et al), require a metal seal reinforcement as well as a slideway to provide the necessary retention with the guides. In addition, the edge of the glass must be beveled in order to mate properly with the seal, such beveling adding considerably to the manufacturing expense of the window.

In addition to retention concerns, the seal must also provide significant sealing so as to prevent moisture and air from penetrating into the vehicle interior compartment. Insignificant sealing is provided, for example as by the seal shown in Mesnel et al., due to single surface seal contact with the window. Should moisture or air penetrate that contact, a path exists between the seal and the guide member to allow access into the vehicle.

As such, a window guide and seal system is needed which provides a flush window-to-body contour without discontinuity while maintaining adequate retention and sealing capability.

SUMMARY OF THE INVENTION

Responsive to the above noted deficiencies in the related art, the present invention provides a guide and sealing system for a lowerable window in an automotive door of the type formed of an inner panel and an outer panel. The door has an aperture formed there through for receiving a window pane, which has an inner surface, an outer surface substantially flushed with adjacent door surfaces, and which is slidable moveable interiorally of the door panel between an open position and a closed position with respect to the window aperture. The guide and sealing system has a guide member secured to the inner surface of the window pane along substantially the entire length of at least one lateral edge thereof. The guide member has an attachment edge secured to the inner surface of the window pane, and a guide edge connected to the attachment edge with a base defining a guide conduit therebetween. A door channel, preferably formed with weld flanges of the inner and outer panels, has first and second prongs extending from the door panels which define a channel therebetween. The door channel is interposed with the guide member such that the guide member receives the first prong within the guide conduit and the door channel receives the guide edge within the channel portion. A seal member is mounted on the door channel so as to substantially fill a space between a guide edge and the first prong. The seal member has a least two lip members, two of which extend laterally outward from the prongs of the door channel so as to contact inward facing surfaces of the guide member. A compliant bulbous lip member is compressively sealingly interposed in non-overlapping relationship between the lateral edge of the window and the outer panel.

Preferably, the seal member has a first lip member extending laterally outward from the first prong of the door channel so as to contact an inward facing surface of the attachment edge of the guide member. A second lip member extends laterally from the second prong of the door channel so as to contact an inward facing surface of the guide edge, and a third lip member extends from a tip edge of the second prong so as to contact a corner of the guide member formed by the guide edge and the base. The seal member may be constructed of two sections, a first section attached to the first prong with a first lip member and the compliance bulbous lip member extending therefrom, and a second section, attached to the second prong, with second and third members extending therefrom.

The guide member is preferably bonded to an inner surface of the window pane so as not to overlap in any manner with the outer surface of the window pane. In addition, the guide member is attached without use of screws or other fasteners which penetrate the window pane.

An advantage of the present invention is a guide and sealing system for a vehicle window in which the guide system is situated completely on the inside of the window opening.

Another advantage of the present invention is a lowerable vehicle window in which the outer surface of the window pane is flush with surrounding sheet metal.

Yet another advantage of the present invention is a guide and seal system providing a flush glass window system for a vehicle in which only a small gimp filler is situated between the window pane and adjacent sheet metal thereby eliminating exposed glass run surfaces around the window pane.

A further advantage of the present invention is a guide and seal system which compensates for manufacturing and build variations in a vehicle door.

A feature of the present invention is a bulbous compliant seal member extending from the window seal and situated in non-overlapping relationship with the window pane and door outer panel.

Yet another feature of the present invention is at least three lip members extending from the seal so as to contact inward facing surfaces of the guide member.

Another advantage of the present invention is a guide and seal system on the interior of the window pane which provides stable window tracking while also providing secure sealing of the window-to-door interface.

Another feature of the present invention is a window guide running substantially along the length of a lateral edge of a window pane on an interior surface thereof.

BRIEF DESCRIPTION OF THE DRAWINGS

These and other objects, advantages and features of the present invention will be apparent to those skilled in the vehicle window arts upon reading the following description with reference to the accompanying drawings, in which:

FIG. 4 is an interior view of the window of FIG. 3 shown with a guide and sealing system according to the present invention;

FIG. 5 is a cross sectional view taken along line 5—5 of FIG. 1;

FIG. 6 is a cross sectional view taken along line 6—6 of FIG. 1;

FIG. 7 is a cross sectional view similar to FIG. 6 but shown with a window pane in a partially open position.

DETAILED DESCRIPTION OF THE PREFERRED EMBODIMENTS

Figure 1:
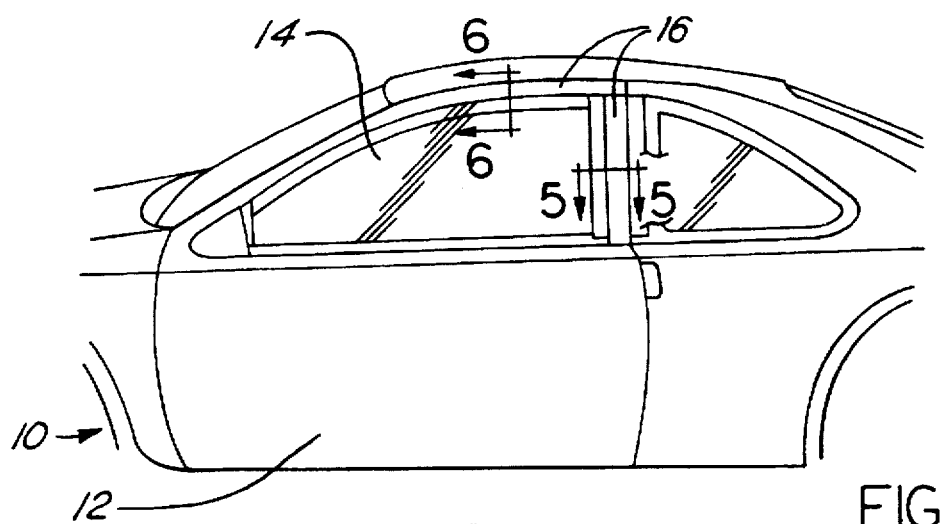
FIG. 1 is a side view of a vehicle showing a vehicle door with a lowerable window.
Figures 2, 3:
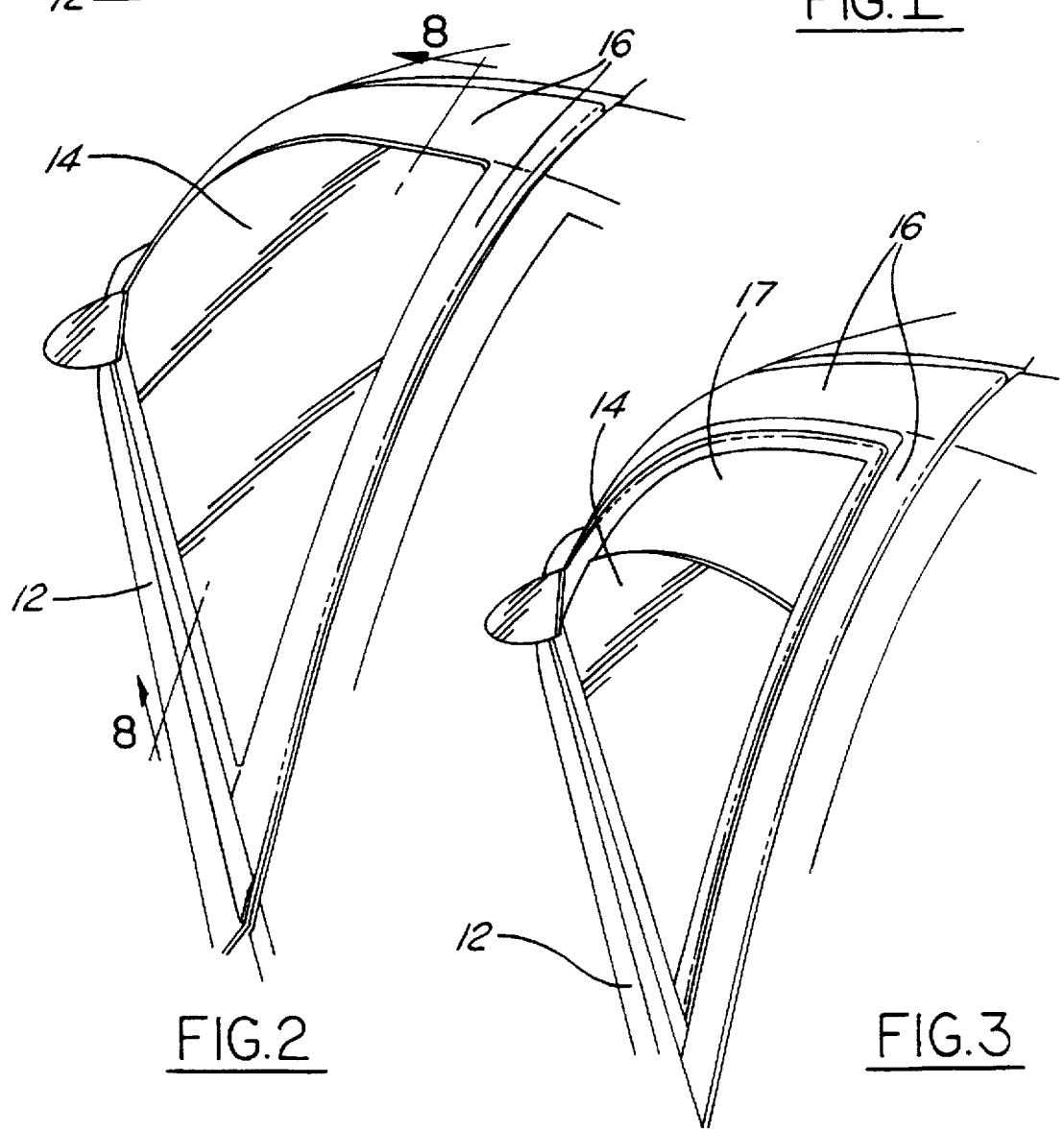
FIG. 2 is a side-rear perspective view looking forward along the vehicle door shown in FIG. 1, and showing the window pane in a closed position substantially flushed with adjacent door surfaces.
FIG. 3 is a view similar to FIG. 2 but showing the window in a partially open position.

As seen in FIG. 1 of the drawings, a side view of an automotive vehicle 10 having a door 12 with a window pane 14 is shown. It is desirable for aesthetic purposes to have the window pane 14 conform with adjacent door surfaces 16 to form a substantially continuous surface. To this end, the window pane 14 must meet the door surfaces 16 essentially without interruption from protuberances, such as seals, as seen in FIG. 2. In this manner, aerodynamic efficiency is increased and wind noise experienced by passengers within the vehicle reduced. As is common with automotive vehicles, the window pane 14 can be lowered into and raised out of the door 12, thus opening and closing an aperture 17 (FIG. 3). When in a lowered position (FIG. 3), the window pane 14 still meets the side portions of adjacent door surfaces 16 in a flush manner.

The window pane 14 is positioned by a guide member 18 (FIG. 4) during the raising and lowering operations. The guide member 18 is attached to an inner surface 19 of the window pane 14 as is more fully described below. To ensure adequate retention of the window pane 14 to the door 12, the guide member 18 preferably is attached along substantially the entire length of a lateral edge 21 of the window pane 14. The guide member 18 can be constructed of a hard plastic material, but preferably is made of metal, such as steel, as is formed or stamped into a U-shape.

Referring now to FIG. 5, a cross-sectional view of a side of the door 12 and window pane 14 showing the guide and sealing system of the present invention is presented. As is common in automotive vehicles, door 12 is constructed of an inner panel 20 attached to an outer panel 22 in a fashion known to those skilled in the art and suggested by this disclosure. Portions of panels 20, 22 are formed and welded into weld flanges to produce an inner prong 24 and an outer prong 26, which form a channel 28 therebetween. The guide member 18 is comprised of an attachment edge 30 and a guide edge 32 connected by a guide member base 34, thus forming a guide conduit 36. The attachment edge 30 is attached to the inner surface of window pane 14 so that it neither penetrates pane 14 nor overlaps the outer surface of pane 14, preferably by bonding. The guide edge 32 is received between prongs 24 and 26, and outer prong 26 is received between attachment edge 30 and guide edge 32. In this way, the channel 28 is interposed with the guide conduit 36 to provide positioning of the window pane 14 during the range of its motion, and retention against pressure differences created by air flow over the vehicle surface.

To provide sufficient sealing for the window-to-door interface, a robust seal member 38 is attached between the window pane 14 and the surrounding door 12 structure (FIG. 5). The seal member 38 runs between both the channel 28 and the guide conduit 36 to a gap 39 between the window pane 14 and outer panel 22. The seal member 38 is mounted to prongs 24, 26 so as to substantially fill a space 27 between the outer prong 26 and the guide edge 32. Three lip members and a compliant bulbous lip member cooperate with the guide member 18 to seal the window. A first lip member 40 extends from a tip edge of the seal member 38 on inner prong 24 to contact a corner 41 of the guide member 18 formed by the guide edge 32 and the guide member base 34. A second lip member 42 extends laterally from the inner prong 24 to contact an inward facing surface of guide edge 32. A third lip member 44 extends laterally from the outer prong 26 to contact an inward facing surface 45 of attachment edge 30. For purposes of this disclosure, inward facing refers to toward the passenger compartment, which in FIG. 5 is to the top. Finally, a compliant bulbous lip member 46 is compressed between a lateral edge of the window pane 14 and the outer panel 22 in non-overlapping relationship therewith. The lip member 46 fills the gap 39 without extending beyond a plane formed by the external surfaces 47, 49 of the window pane 14 and the outer panel 22, respectively, thus creating a seal substantially flush between the window pane 14 and the outer panel 22. The lip members 40, 42, 44, 46 thus described ensure adequate sealing between the window and door, and in particular are well suited for compensating for vehicle door build tolerances. Placement of the lip members 40, 42 44 to contact inward facing surfaces of the guide member 18 is important to provide positive outward pressure on the edge 21 to maintain window pane 14 in a flush relationship with the adjacent sheet metal. In addition, such an arrangement maximizes the contact area of the lip members 40, 42, 44 with the guide member 18.

Turning now to FIG. 6, an upper edge of the window is shown with a seal member 48 interacting with the window pane 14 when in a closed position. Like the seal member 38 of FIG. 5, the seal member 48 is mounted to the prongs 24, 26. The seal member 48 preferably has two functional sealing lip members, namely, a compressible bulbous lip member 50 and a window lip member 52. The bulbous lip member 50 is compressed by a top edge 51 of the window pane 14, thus producing a seal and creating a substantially flush surface between the window pane 14 and the adjacent door surfaces 16. The window lip member 52 contacts the window pane 14 and to seal with the inner surface 19 thereof. Additional flexibility is achieved by providing a notch 55 in the window lip member 52 which flexes between a sealing position with the window pane 14 in a closed position (FIG. 6) and an extended position when the window pane 14 is lowered (FIG. 7). In the extended position of FIG. 7, the bulbous lip member 50 has acquired a noncompressed shape, and the lip member 52 is no longer inwardly displaced by the window pane 14. Thus, bulbous lip member 50 and lip member 52 are poised to accept pane 14 to accomodate sealing upon its raising.

Figure 8:
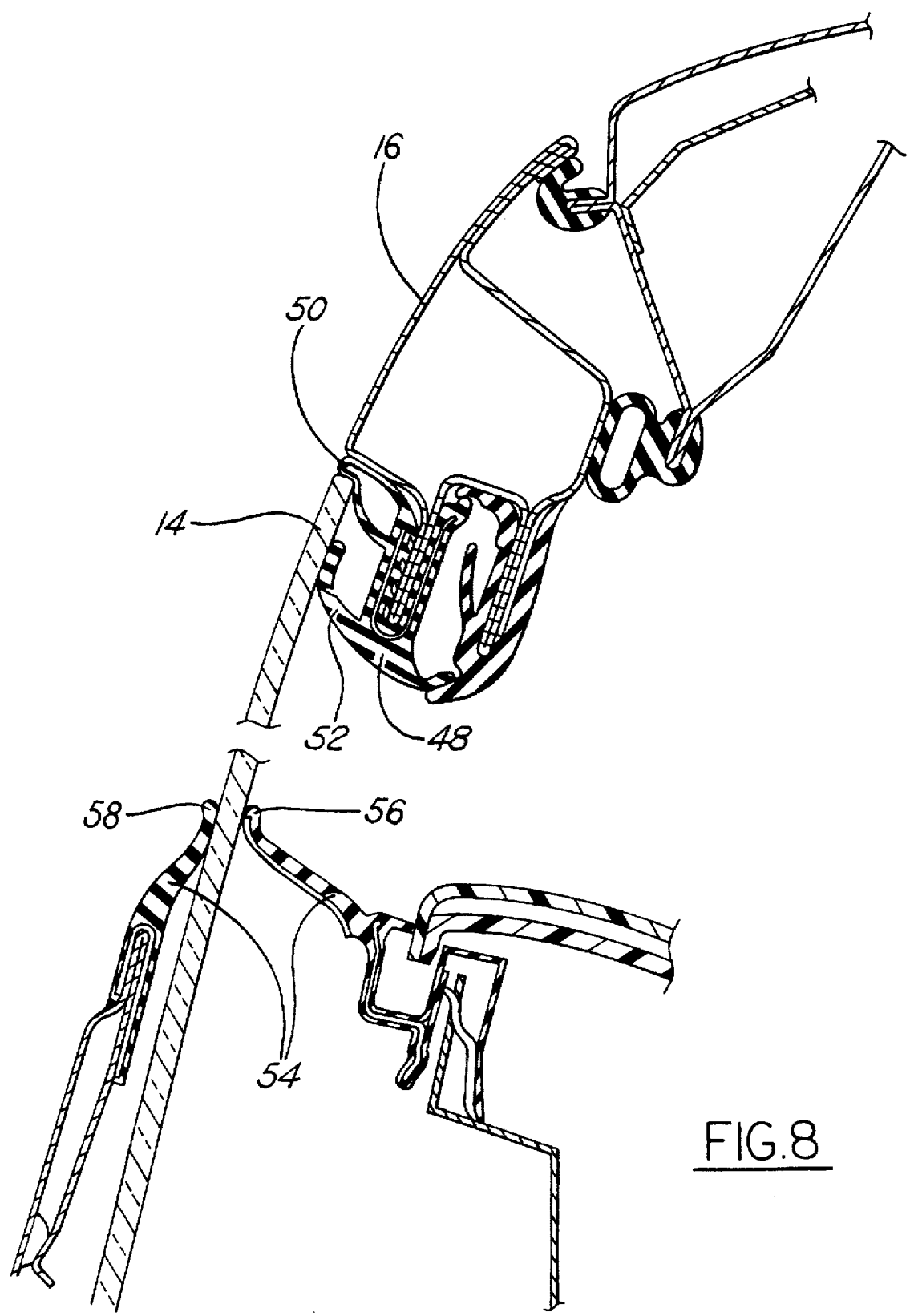
FIG. 8 is a cross sectional view taken alone 8—8 of FIG. 2.

FIG. 8 shows a cross-sectional view of an entire window pane 14 and surrounding body structure. As discussed above, the seal member 48 serves to seal the top of window pane 14 when in a fully closed position. In addition to the sealing the upper edge of the window pane 14, a lower edge, commonly called the beltline, is sealed with a belt seal 54 having inner and outer lip members 56, 58, respectively, as is well-known to those skilled in the art. The flush glass nature of the present invention is seen in FIG. 8 as the window pane 14, the bulbous seal member 50, and o the adjacent door surface 16 form a substantially smooth and uninterrupted surface to thereby decrease drag thereover.

In an alternative embodiment, seal member 38 can be constructed of of two separate sections, a first section which attached to the outer prong 26 and including the compliant bulbous lip member 46 and lip member 44, and a second section which attaches to the inner prong 24 and includes of lip members 40, 42.

The seal member 48 can alternatively be an extention of the seal member 38. Consequently, a single seal is formed for sealing both horizontal and vertical window pane/adjacent surface intersections, the seal having a cross section similar to that of seal member 38. The seal members 38, 48, in any embodiment of the present invention, can be extruded from a rubber material such as is commonly used for window seals.

Portions of the seal member 38, including the lip members 40, 42, 44, as well as bulbous member 46, can be flocked in a manner known in the art. Preferably, the surfaces are slip-coated with a friction reducing coating to enhance seal apperance in addition to reducing drag of the guide member running through the seal.

Although the preferred embodiment of the present invention has been disclosed, various changes and modifications may be made without departing from the scope of the invention as set forth in the appended claims.

We claim:

1. A guide and sealing system in combination with a lowerable window in an automotive vehicle door of a type formed of an inner panel and an outer panel and having an aperture formed therethrough for receiving the window, the window having an inner surface, an outer surface substantially flush with adjacent door surfaces, and being slidably movable interiorally of the door panels between an open position and a closed position with respect to the aperture, the combination comprising:

(1) a guide member secured substantially along at least one lateral edge of the window the guide member having:
      (a) an attachment edge secured to the inner surface so as not to overlap with the outer surface, and
      (b) a guide edge connected to the attachment edge with a base so as to define a guide conduit between the attachment edge and the guide edge;
   (2) a door channel having first and second prongs extending from the door panels defining a channel portion therebetween and interposed with the guide member such that the guide member receives the first prong within the guide conduit and the door channel receives the guide edge within the channel portion; and
   (3) a seal member mounted on the door channel so as to substantially fill a space between the guide edge and the first prong, the seal member having:
      (a) a first lip member extending laterally outward from the first prong of the door channel so as to contact an inward facing surface of the attachment edge of the guide member;
      (b) a second lip member extending laterally outward from the second prong of the door channel so as to contact an inward facing surface of the guide edge;
      (c) a third lip member extending from a tip edge of the second prong so as to contact a corner of the guide member formed by the guide edge and the base; and
      (d) a compliant bulbous lip member compressively sealingly interposed in non-overlapping relationship between the at least one lateral edge of the window and the outer panel.

2. A guide and sealing system as defined in claim 1 wherein the seal member has a first section, attached to the first prong, with the first lip member and the compliant bulbous lip member extending therefrom, and a second section, attached to the second prong, with the second and third lip members extending therefrom.

3. A guide and sealing system as defined in claim 2 wherein at least one of the first and second sections has a metal reinforcement therein substantially conforming to a respective prong.

4. A guide and sealing system as defined in claim 2 wherein at least one of the first and second sections has retaining spurs thereon for retention to a prong.

5. A guide and sealing system as defined in claim 1 wherein the seal member extends along an upper edge of the aperture such that the first lip member contacts an inward facing surface of the window pane.

6. A guide and sealing system as defined in claim 5 wherein the first lip member has a deflection notch therein to facilitate movement of the window thereagainst.

7. A guide and sealing system as defined in claim 1 wherein the seal member is made from an extruded rubber material.

8. A guide and sealing system in combination with a lowerable window in an automotive vehicle door of a type formed of an inner panel and an outer panel and having an aperture formed therethrough for receiving the window, the window having an inner surface, an outer surface substantially flush with adjacent door surfaces, and being slidably movable interiorally of the door panels between an open position and a closed position with respect to the aperture, the combination comprising;

a U-shaped guide secured to the inner surface substantially along at least one lateral edge thereof and having an inner channel surface, an outer channel surface, and a channel portion;
   first and second laterally spaced weld flanges formed from the inner and outer panels, and disposed inwardly of the inner surface, the first weld flange extending into the channel portion and a second weld flange laterally inward of the first flange not within the channel portion; and
   seal means mounted to the first and second weld flanges along the at least one lateral edge for sealing the window and door, the seal means having:
      an interior lip member in contact with the inner channel surface;
      an exterior lip member in contact with the outer channel surface; and
      a compliant bulbous member interposed between the at least one lateral edge of the window and the outer panel in flush relationship with the outer surface of the window and an exterior surface of the outer panel.

9. A guide and sealing system as defined in claim 8 wherein the seal means has a first section, attached to the first weld flange, with the exterior lip member and the compliant bulbous lip member extending therefrom, and a second section, attached to the second weld flange, with the interior lip member extending therefrom.

10. A guide and sealing system as defined in claim 9 wherein at least one of the first and second sections has a metal reinforcement therein substantially conforming to a respective a weld flange.

11. A guide and sealing system as defined in claim 9 wherein at least one of the first and second sections has retaining spurs thereon for retention to a prong.

12. A guide and sealing system as defined in claim 8 wherein the seal means extends along an upper edge of the aperture such that the exterior lip member contacts an inward facing surface of the window.

13. A guide and sealing system as defined in claim 12 wherein the exterior lip member has a deflection notch therein to facilitate movement of the window thereagainst.

* * * * *